United States Patent
Piening et al.

[11] Patent Number: 6,164,599
[45] Date of Patent: Dec. 26, 2000

[54] AEROFOIL PROFILE WITH VARIABLE PROFILE ADAPTATION

[75] Inventors: Matthias Piening; Hans Peter Monner, both of Braunschweig, Germany

[73] Assignee: Deutsches Zentrum fur Luft-und Raumfahrt e.V., Bonn, Germany

[21] Appl. No.: 09/157,711

[22] Filed: Sep. 21, 1998

[30] Foreign Application Priority Data

Sep. 19, 1997 [DE] Germany ............... 197 41 490

[51] Int. Cl.⁷ ................................................ B64C 3/44
[52] U.S. Cl. .................................. 244/215; 244/219
[58] Field of Search ............................. 244/215, 213, 244/212, 219

[56] References Cited

U.S. PATENT DOCUMENTS

| | | | |
|---|---|---|---|
| 1,500,810 | 7/1924 | Glasby, Jr. | 244/219 |
| 3,042,371 | 7/1962 | Fanti | 244/219 |
| 3,109,613 | 11/1963 | Bryant et al. | 244/219 |
| 3,146,973 | 9/1964 | Haase | 244/219 |
| 3,332,383 | 7/1967 | Wright | 244/219 |
| 3,698,668 | 10/1972 | Cole | 244/219 |
| 3,994,452 | 11/1976 | Cole | 244/219 |
| 4,113,210 | 9/1978 | Pierce | 244/219 |
| 4,247,066 | 1/1981 | Frost et al. | 244/219 |
| 4,312,486 | 1/1982 | McKinney | 244/219 |
| 4,351,502 | 9/1982 | Statkus | 244/219 |
| 5,150,864 | 9/1992 | Roglin et al. | 244/219 |
| 5,186,420 | 2/1993 | Beauchamp et al. | 244/219 |
| 5,224,826 | 7/1993 | Hall et al. | 244/219 |
| 5,367,970 | 11/1994 | Beauchamp et al. | 244/219 |

FOREIGN PATENT DOCUMENTS

| | | |
|---|---|---|
| 367939 | 1/1923 | Germany . |
| 1 234 874 | 8/1967 | Germany . |
| 27 13 902 A1 | 10/1977 | Germany . |
| 23 48 304 | 1/1980 | Germany . |
| 27 55 442 C2 | 7/1985 | Germany . |
| 40 02 972 C2 | 6/1994 | Germany . |
| 215048 | 5/1924 | United Kingdom . |
| 290300 | 8/1929 | United Kingdom . |
| 452116 | 8/1936 | United Kingdom . |
| 1124358 | 8/1968 | United Kingdom . |
| 1339018 | 11/1973 | United Kingdom . |
| 1536331 | 12/1978 | United Kingdom . |
| 2059368 | 4/1981 | United Kingdom . |

*Primary Examiner*—J. Woodrow Eldred
*Attorney, Agent, or Firm*—Salter & Michaelson

[57] ABSTRACT

In an aerofoil profile with variable profile adaptation and rigid rib structure, the aerofoil profile has a flexible rib structure with rib elements, which are arranged in segments and are articulated to one another in the form of a kinematic chain in order to transmit movement, a skin panel capable of sliding on this and also at least one driving means for moving the flexible rib structure.

18 Claims, 3 Drawing Sheets

AEROFOIL PROFILE WITH VARIABLE PROFILE ADAPTATION

DESCRIPTION

1. Technical Field

The invention relates to an aerofoil profile with variable profile adaptation and rigid rib structure as well as to a method of operating such an aerofoil profile.

2. Background of Related Art

Support surfaces in the form of aerofoil profiles are known in the application to aircraft. They are exposed to constantly changing external conditions from take-off to landing of the aircraft, and are additionally also constantly exposed to new flight conditions as a result of operation, e.g. of fuel consumption and the resulting weight loss. Nevertheless, the design of known aerofoil profiles in the form of wings of modem subsonic commercial aircraft continues to be optimized only for one operating point. In order to achieved optimum operating conditions in the different phases of a flight, flaps have been used in commercial aircraft for many years, by means of which adaptation of the wing profile can be made mainly in the take-off and landing phase. To assure utilization of the maximum flow potential over the entire mission profile of the wing, it should be possible to optimally adapt the wing geometry for each flight status. The arching on the wing trailing edge constitutes an important geometric magnitude to be adapted here.

Therefore, aerodynamic improvements to wings have constantly been undertaken in theory and in practice, e.g. extensible leading and trailing edge flaps have been provided in modern commercial aircraft which are used during the take-off and landing phase, i.e. in periods of slow flight. Scarcely any improvements in performance have been achieved for the fast flight phase of subsonic long-distance aircraft at high and medium altitudes.

Wings with variable profile adaptation are known in a very wide variety of forms, e.g. from DT 2 713 902, DE 27 55 442, U.S. Pat. No. 4,351,502, GB 2 059 368. The known variable profile adaptations thereby use, on the one hand, tilting elements, which are rotatably connected to one another and can be inclined towards one another by adjusting mechanisms. Such an adjusting mechanism is, for example, provided by a threaded spindle, whereby several such threaded spindles can be connected to one another via ball elements and the drive is achieved via a rotary actuator. Alternatively hereto, lever mechanisms are also known (for example, as described in DE 27 55 442, U.S. Pat. No. 4,351,502, GB 2 059 368). In these cases, an arching flap adjustment in aircraft or watercraft is achieved by a more or less complicated lever mechanism as well as a flexible upper covering skin of the flap element, which is inclined by the lever mechanism. In this case, this is run into or extended out of a likewise provided front part. However, the lever mechanism can also be provided so that it comprises a rotary arm, which with one rigid part is rotatably disposed in a further part and is driven via an active hinge. The rotary arm is rotatably connected to a movable part. Further elements are rotatably disposed and coupled to one another to allow axial displacement via a sliding sleeve. One of these further elements is firmly connected to the rigid part and the other element is firmly connected to the movable part. GB 2 059 368 describes such an arrangement.

The object of the invention is to provide an aerofoil profile with variable profile adaptation in a design suitable for lightweight construction as well as a method for its operation.

SUMMARY

The object is achieved by an aerofoil profile with variable profile adaptation, in which a rib structure of the aerofoil profile is provided which has rigid regions and flexible regions, which the flexible region including rib elements are arranged in segments and are articulated to one another in the form of a kinematic chain in order to transmit movement, a skin panel capable of sliding on this and also at least one driving means for moving the flexible rib structure. The object is achieved by a method of operating such an aerofoil profile in that a driving means arranged in the rigid part of the aerofoil profile acts directly or indirectly on a movable rib element of the flexible rib structure and deflects this outwards, that a first rib element is firstly deflected outwards, followed by a further movable rib element, as a result of the articulated attachment of the movable rib elements to one another, that the movement continues via further movable rib elements articulated to one another respectively from one rib element to another rib element, whereby the inclination of the rib element continues to the inclination of the or a following rib element, and that the skin panel of the aerofoil profile in the region of the outwardly deflected rib elements slides over these and permits their free mobility. Further developments of the invention are defined in the respective sub-claims.

Such variable arching of the wing trailing edge as an aerofoil is primarily achieved in commercial aircraft by the flexible structure of the Fowler flaps. It is very important thereby to permit arching which is both constant over the span distance and also differentiated over the span distance. A constant arching of the wing trailing edge thereby serves to optimize the contour during the cruising flight so as to be able to achieve a greater or lesser degree of arching in dependence upon the Mach number and flight weight. Arching is greater at the beginning of the flight, i.e. with a high flying weight, whereas only slight arching is necessary at the end of the flight. A redistribution of the wing loads is undertaken in dependence on the respective flight status by the deflection differentiated over the span distance. Particularly with narrow, large wings, this provides the possibility of being able to configure the critical wing distortion so that it is controllable over the entire flight range.

An aerofoil profile, in particular a wing, with variable profile adaptation is provided, which does not need a high number of driving means in the form of actuators. It is advantageous if such an aerofoil is of lightweight construction, of light design. In the case of the Fowler flaps of modem commercial aircraft, the ribs absorb a high component of the air loads prevailing there by means of their sliding and bending resistance and thus contribute decisively to the entire flap rigidity. This is used by the provision of the flexible rib structure according to the invention. In the flexible rib structure according to the invention preferably only a single driving means in the form of an actuator is required per rib to incline the flexible rib structure. The flexible rib structure according to the invention has also proved particularly advantageous because it exhibits a high rigidity at the same time as having a low increase in weight and thickness in relation to known wings with variable profile adaptation. The high sliding and bending resistance of discs is also utilized advantageously according to the invention. The rib elements are namely preferably flat and essentially disc-shaped and are respectively disposed to move and/or to pivot on the preceding rib element.

In the aerofoil profile according to the invention, the otherwise rigid rib end pieces are advantageously replaced by the flexible rib structure in the trailing region of the aerofoil profile. However, the front region of the respective ribs of the aerofoil profile is still preferably of rigid construction. If it would be expedient for the specific application, however, the front region may also be constructed according to the invention, i.e. have rib elements which are articulated to one another in the form of a kinematic chain.

A single skin panel enclosing the aerofoil profile is preferably provided which is capable of sliding over the entire rib extension. Alternatively, at least two skin panels are provided, which enclose the aerofoil profile so that in the region of the rigid front part of the ribs, a fixed skin panel incapable of sliding over this is provided, and in the flexible end region of the rib, a skin panel capable of sliding over this is provided.

A respective actuator is fixed as driving means for the flexible sub-region of the rib of the aerofoil profile in the rigid part-region of the rib. However, it can also be fixed to another point in the rigid region of the wing. In both cases, it acts on the rib elements of the flexible part of the respective ribs either directly or indirectly, i.e. via links provided between the rib elements.

Link elements are preferably arranged between the rib elements of the flexible rib structure. The link elements between the rib elements are preferably designed so that they permit movement in two directions, as a result of which the flexible rib structure may be deflected outwards in different directions. The flexible rib structure can preferably be deflected upwards and downwards, whereby the movement of the structure continues from rib element to rib element in the form of a kinematic chain, following leverage laws. Therefore, the connection of the rib elements amongst themselves transmits movement. The aerofoil profile arching is generated by inclining the flexible rib structure in relation to the rigid rib structure, this being permitted by the provision of the skin panel capable of sliding over at least this flexible region, i.e. no distortion or jamming occurs. In dependence on the inclination of individual rib elements towards one another, the aerofoil can be arched to a greater or lesser degree. As a result, the aerofoil profile can be variably adapted in accordance with the specific application and situation.

The aerofoil profile can be an airplane wing, a helicopter rotor, a rotor of a wind power plant, flaps on a plane's tail or any other aerodynamic or flow profile. For example, the aerofoil profile according to the invention can also be used in watercraft or in the deflection of flow media.

BRIEF DESCRIPTION OF THE DRAWINGS

For more detailed explanation of the invention, an embodiment is described below on the basis of the drawings.

DETAILED DESCRIPTION OF THE ILLUSTRATIVE EMBODIMENTS

Figure 1:
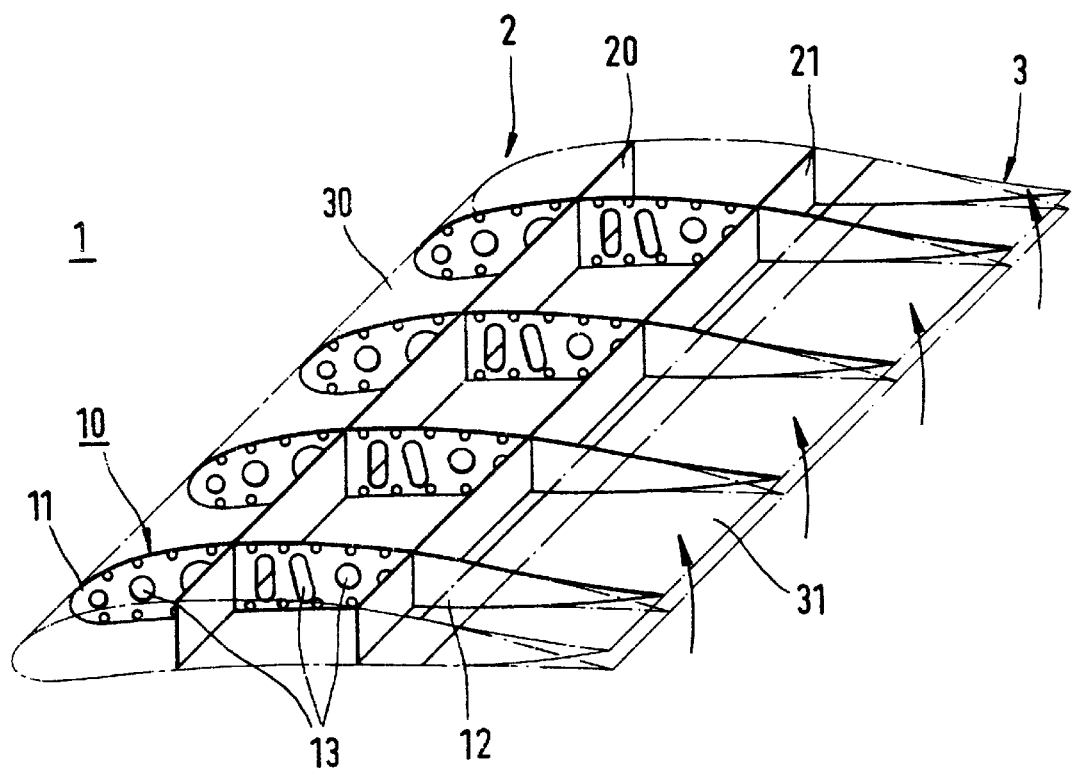
FIG. 1 shows a perspective view of a wing profile with flexible rib structure according to the invention.

FIG. 1 shows a perspective view of a wing 1 (which may be part of a plane's tail) with a front profile 2 and a rear profile 3. The rear profile 3 is in the form of an aerofoil profile of the flexible region of a Fowler flap.

The wing 1 has ribs 10 in the form of longitudinal ribs and transverse supports 20, 21 connecting these. The overall arrangement is enclosed by a skin panel 30, 31. The longitudinal ribs 10 are divided into a rigid region 11 and a flexible region 12. The rigid region 11 is formed between the front extension of the longitudinal rib essentially to the transverse support 21. The flexible region 12 extends from the transverse support 21 up to the rear tip of the longitudinal rib, i.e. to the trailing edge of the wing. The rigid region 11 is preferably provided with openings 13. As a result, the stability of the longitudinal rib is maintained, while at the same time being produced in a manner suitable for lightweight construction. The rib is preferably produced from a light material, in particular a fibre composite.

The flexible region of the longitudinal ribs may be swivelled upwards and downwards. To permit this swivelling capability, the skin panel 31 enclosing this flexible region 12 is capable of sliding on this region of the longitudinal ribs. This means that the skin panel is not connected to be fixed to the ribs there. However, in region 11, i.e. the rigid region of the longitudinal rib, the skin panel 30 is not capable of sliding. No relative movement between the skin panel and the rigid region of the longitudinal rib is necessary in this region, which is why the skin panel can be fastened in a fixed manner to this region. However, it is also alternatively possible to construct the entire skin panel so that it is capable of sliding over the wing, preferably as far as the front profile 2. However, care must be taken to prevent any bulging of the skin panel as a result of the sliding capability at undesired points. The skin panel should be fixed at least at two points, in particular the wing leading and trailing edges of the wing.

Figure 2:
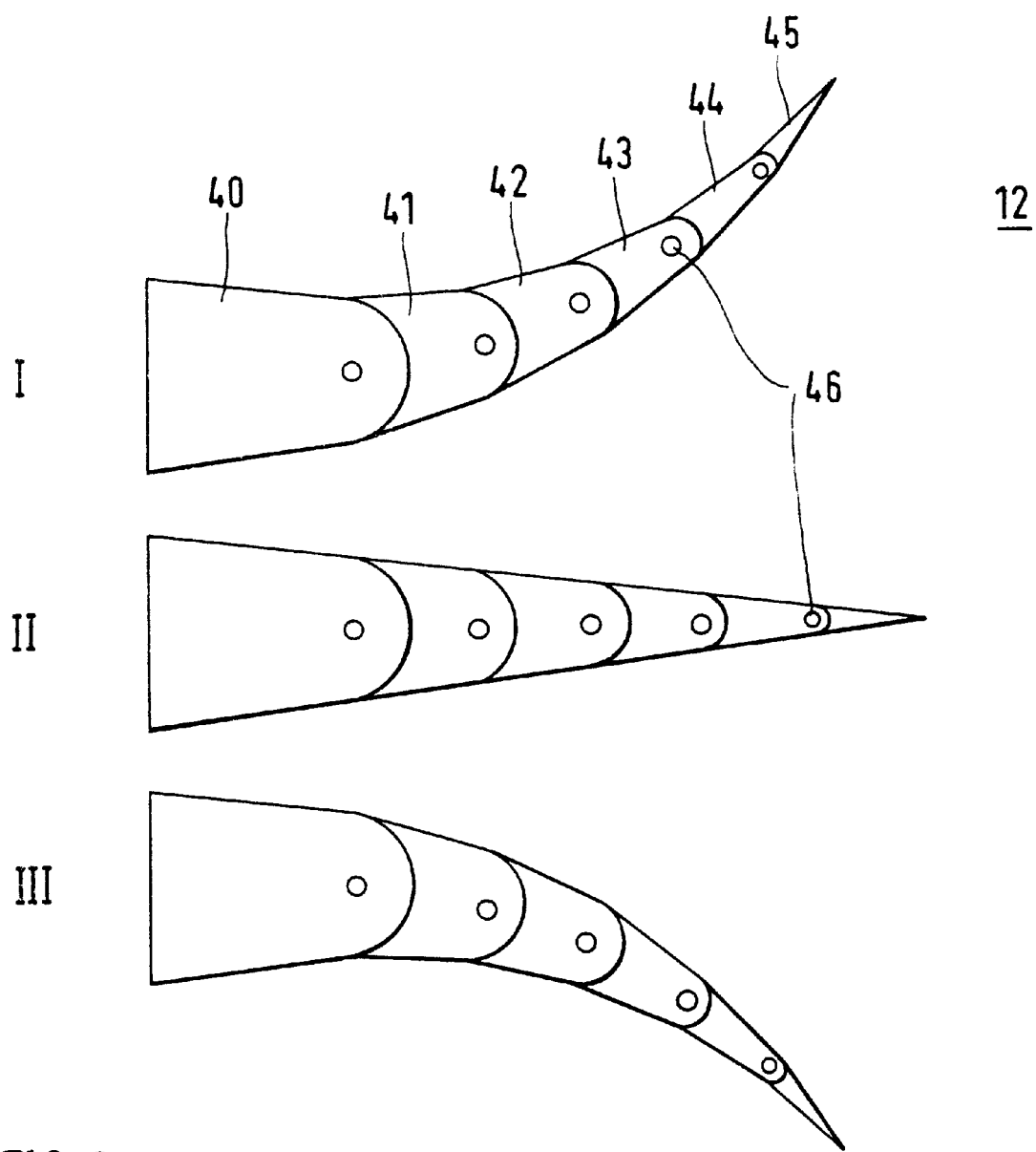
FIG. 2 is a detail view of the flexible rib structure according to FIG. 1 in the normal position, the up position and the down position.

The structure of the flexible region 12 may be seen more clearly in FIG. 2, in which a side view of this flexible region 12 is shown, on the one hand, in the normal position (II), on the other hand, in the upward deflected position (I) and the downward deflected position (III). The flexible region is formed from individual disc-shaped rib elements 40 to 45. Rib element 40 is preferably firmly connected to the rigid region 11 of the longitudinal rib, rib element 45 forming the rear tip of the flexible region 12, the wing trailing edge. To clearly show the rib elements, these are indicated in different shadings in FIG. 2. Rib elements 40 to 45 are connected amongst themselves by links 46. The individual rib elements may be swivelled or inclined towards one another as segments one behind the other. This results in a variable trailing edge arching for the wing. Namely, a variable, different arching of this flexible region of the longitudinal rib results depending on the respective inclination of the individual rib elements relative to one another.

To achieve such an inclined arrangement between the individual rib elements joined to one another in the manner of members, a driving means is positioned, for example, in the rigid region 11 of the longitudinal rib. A suitable attachment location thereby is, for example, an opening 13 in the region of the transition from the rigid region to the flexible region of the longitudinal rib. Such an opening is shown in FIG. 1, for example, in the vicinity of the transverse support 21. As driving means, an actuator is connected to a movable rib element or one of the links 46. The actuator thus operates one of the rib elements, as a result of which this is inclined. The following or adjacent rib elements are connected to one another in such a way that when one rib element is deflected out, the following or adjacent rib element is also deflected out with it. The further rib elements are also connected to one another in such a way that when the respectively adjacent rib element is deflected out, the next rib element is moved with it. By outward deflection of the first rib element in relation to the rest of the rib elements, a chain movement is thus set in motion (kinematic chain), as a result of which one element after the other is inclined in relation to the preceding one. The result is arching of the entire flexible region 12.

The skin panel 31 enclosing this region must be at least elastically flexible, but more favorably must be capable of sliding on this flexible region, since otherwise upon arching upwards, the skin panel on the underside of the flexible region would tear and the skin panel on the upper side would bulge outwards.

It has proved particularly advantageous to produce the individual rib elements 40 to 45 of flat construction. Such flat rib elements have a high shear resistance and are suitable for lightweight construction. In comparison to a known rigid longitudinal rib with a continuous flat structure, they constitute only a slight increase in weight because of the links 46. However, this does not contradict the lightweight design concept.

Figure 3:
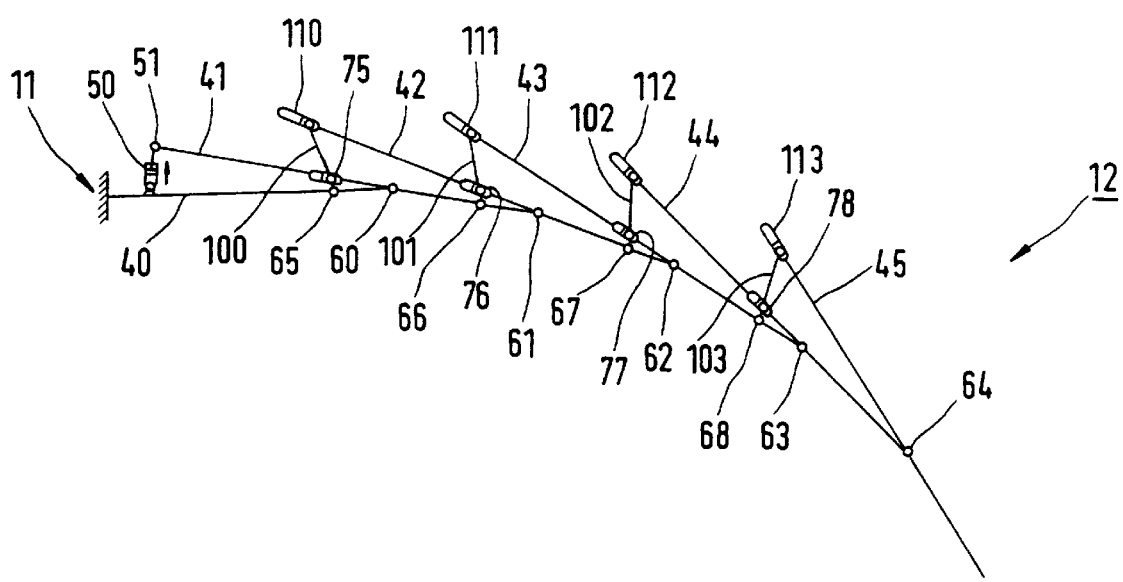
FIG. 3 is an elementary sketch of an embodiment of a flexible region constructed according to the invention with lever elements.

An alternative embodiment of the flexible region 12 constructed according to the invention is evident from FIG. 3, which shows an elementary sketch. Lever elements 100 to 103 are provided in this embodiment. An actuator 50 is supported on the first rib element 40. The first rib element 40 is also firmly connected to the rigid region 11 of rib 10.

The second rib element 41 is driven by the actuator 50 via an actuating link 51. The second rib element 41 is connected to the first rib element 40 via a rotating link 60. The third rib element 42 is coupled to the second rib element 41 by means of a rotating link 61.

The connecting member between the first three rib elements is the lever element 100. This is rotatably connected to the first rib element 40 in link 65, to the second rib element 41 via a sliding link 75 and to the third rib element 42 via a further sliding link 110.

Connection of the respectively following rib elements to the second and third rib elements is provided accordingly. The third rib element 42 is thereby connected to the second rib element 41 via rotating link 61, the fourth rib element 43 is connected to the third rib element 42 via rotating link 62, the fifth rib element 44 is connected to the fourth rib element 43 via rotating link 63 and the sixth rib element 45 is connected to the fifth rib element 44 via rotating link 64. Attachment of the respective lever elements 101, 102 and 103 to the respective rib elements is achieved via rotating links 66, 67, 68 as well as sliding links 76, 77, 78 and 111, 112 and 113.

If the actuator 50 is operated, the second rib element 41 is inclined by a rotation around the rotating link 60. As a result, the lever element 100 is inclined over sliding link 75 by a rotation around rotating link 65. Because of the inclination of lever element 100, the third rib element 42 is rotated around rotating link 61 via sliding link 110. An inclination of the third rib element 42 in relation to the second rib element 41 is achieved as a result of this.

Because of the construction of a kinematic chain as well as the movement-promoting connection of the rib elements amongst themselves, the following rib elements are deflected outwards accordingly, as a result of which the desired arching of the wing trailing edge is generated.

The embodiment shown in FIG. 3 can be used for a flexible region having at least three rib elements. The maximum number of rib elements is not restricted, and therefore as many rib elements as desired can be connected one behind the other.

The inclinations of the individual rib elements towards one another can be varied individually by varying the respective length ratios of lever elements 100, 101, 102 and 103 as well as rib elements 40 to 45.

The principle of the additional provision of lever elements shown in FIG. 3 can also be modified. In particular, instead of the sliding links in the embodiment according to FIG. 3, the elasticity of the structure may also be utilized there and the sliding links replaced by rotating links.

The positioning of the actuator 50 may also be varied. The actuator can act both on a hinge bolt and on the rib elements themselves. Alternatively, a plurality of actuators may also be provided.

It will be understood that various modifications may be made to the embodiments disclosed herein. Therefore, the above description should not be construed as limiting, but merely as exemplifications of a preferred embodiment. Those skilled in the art will envision other modifications within the scope and spirit of the invention.

What is claimed is:

1. An aerofoil member having a profile edge with variable profile adaptation, the aerofoil member comprising:
   a leading edge and a trailing edge;
   at least one rib disposed between the leading edge and the trailing edge and including a substantially rigid region and a flexible region, the flexible region including at least three rib elements arranged in segments and articulated to one another, each of the at least three rib elements including an axis of articulation extending substantially parallel to the profile edge;
   at least one driving means for moving adjacent rib elements relative to each other about their axes of articulation, the rib elements being connected in a kinematic series in order to transmit movement between the rib element; and
   one or more lever elements connected to each of the at least three rib elements by a movable link selected from the group consisting of a rotating link and a sliding link, wherein the one or more lever elements are constructed and arranged to articulate the at least three rib elements with respect to one another during use.

2. The aerofoil profile according to claim 1, wherein the rib elements are substantially flat and disc-shaped so as to provide high stiffness thereof.

3. The aerofoil profile according to claim 2, wherein each of the plurality of rib elements includes a first end and a second end, and wherein at least one of the first and second ends is articulated to the adjacent rib element such that the rib element is movable on a preceding rib element to which it is connected.

4. The aerofoil profile according to claim 1, wherein the driving means comprises an actuator positioned in the rigid region of the at least one rib and is connected to the flexible region.

5. The aerofoil profile according to claim 3, wherein a front region of the at least one rib of the aerofoil profile is substantially rigid and a trailing end region of the rib is flexible.

6. The aerofoil profile according to claim 5, wherein a single skin panel enclosing the aerofoil profile is provided which is slidable over the front and rear regions of the rib.

7. The aerofoil profile according to claim 5, wherein at least two skin panels enclose the aerofoil profile so that in the front region of the at least one rib, a fixed skin panel incapable of sliding over the front region is provided, and in the trailing end region of the at least one rib, a skin panel capable of sliding over the trailing end region is provided.

8. The aerofoil profile according to claim 1, wherein the driving means comprises an actuator is positioned in the rigid region of the rib and acts on a rib element in the flexible region of the rib.

9. The aerofoil profile according to claim 1, further comprising link elements arranged between the plurality of rib elements of the flexible region so that as an individual rib element is deflected a following, adjacent rib element is also deflected, thereby resulting in an arching of the flexible region.

10. The aerofoil profile according to claim 9, wherein the link elements are constructed and arranged to permit movement in two directions, as a result of which the flexible region may be deflected upwards and downwards with respect to a normal plane of the profile.

11. The aerofoil profile according to claim 1, further comprising a skin panel covering the at least one rib element wherein the skin panel slides over the flexible region during movement of the rib elements.

12. The aerofoil profile according to claim 3, wherein the rib element is pivotable on the preceding rib element to which it is attached.

13. The aerofoil profile according to claim 4, wherein the actuator is connected to a rib element.

14. The aerofoil profile according to claim 4, wherein the actuator is connected to a link element arranged between the rib elements.

15. The aerofoil profile according to claim 1, wherein the moveable link is a rotating link.

16. The aerofoil profile according to claim 1, wherein the moveable link is a sliding link.

17. The aerofoil profile according to claim 1, further comprising a transverse support disposed between the substantially rigid region and the flexible region of the rib.

18. The aerofoil profile according to claim 1, wherein the substantially rigid region is provided with openings.

* * * * *